Figure 1:
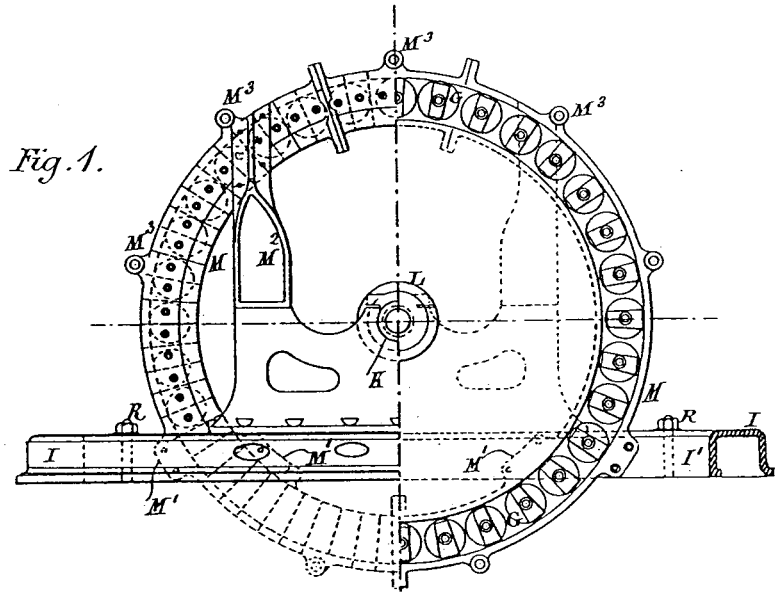

(No Model.) 7 Sheets—Sheet 1.

J. E. H. GORDON.
DYNAMO ELECTRIC MACHINE.

No. 284,292. Patented Sept. 4, 1883.

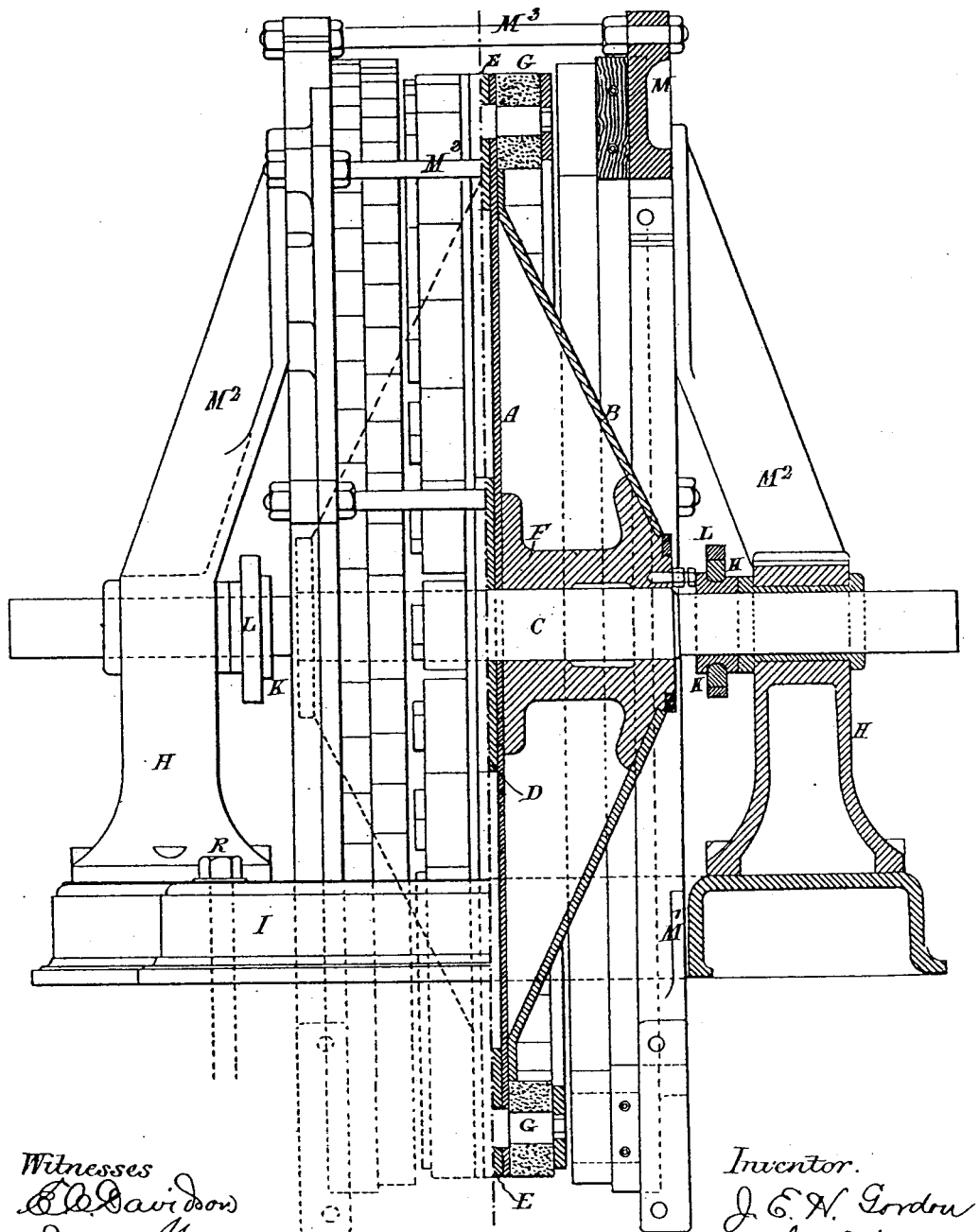

(No Model.)   J. E. H. GORDON.   7 Sheets—Sheet 3.
DYNAMO ELECTRIC MACHINE.

No. 284,292.   Patented Sept. 4, 1883.

Witnesses.   Inventor.

(No Model.) 7 Sheets—Sheet 4.
J. E. H. GORDON.
DYNAMO ELECTRIC MACHINE.

No. 284,292. Patented Sept. 4, 1883.

Witnesses.
E. C. Davidson.
James Young.

Inventor.
J. E. H. Gordon
by his attorneys
Baldwin, Hopkins & Peyton.

(No Model.) 7 Sheets—Sheet 5.

J. E. H. GORDON.
DYNAMO ELECTRIC MACHINE.

No. 284,292. Patented Sept. 4, 1883.

Fig II

WITNESSES
Wm A. Skinkle
Alfred C. Newman

INVENTOR
J. E. H. Gordon
By his Attorneys
Baldwin, Hopkins & Peyton (No Model.) 7 Sheets—Sheet 6.

J. E. H. GORDON.
DYNAMO ELECTRIC MACHINE.

No. 284,292. Patented Sept. 4, 1883.

WITNESSES
Wm A. Skinkle
Alfred C. Newman

INVENTOR
J. E. H. Gordon.
By his Attorneys
Baldwin, Hopkins & Peyton.

(No Model.)  7 Sheets—Sheet 7.

J. E. H. GORDON.
DYNAMO ELECTRIC MACHINE.

No. 284,292.  Patented Sept. 4, 1883.

WITNESSES
Wm A. Skinkle.
Alfred C. Newman.

INVENTOR
J. E. H. Gordon
By his Attorneys
Baldwin, Hopkins & Peyton

UNITED STATES PATENT OFFICE.

JAMES EDWARD HENRY GORDON, OF KENSINGTON, COUNTY OF MIDDLESEX, ENGLAND.

DYNAMO-ELECTRIC MACHINE.

SPECIFICATION forming part of Letters Patent No. 284,292, dated September 4, 1883.

Application filed November 1, 1882. (No model.) Patented in England January 6, 1881, No. 78, December 17, 1881, No. 5,536, and June 17, 1882, No. 2,871; and in France January 18, 1881, No. 140,660, and June 17, 1882, No.149,620.

*To all whom it may concern:*

Be it known that I, JAMES EDWARD HENRY GORDON, a subject of the Queen of Great Britain, residing at Kensington, in the county of Middlesex, England, have invented certain new and useful Improvements in Dynamo-Electric Machines, (for which I have received Letters Patent in Great Britain, No. 78, dated January 6, 1881; No. 5,536, dated December 17, 1881; and No. 2,871, dated June 17, 1882; and in France, No. 140,660, dated January 18, 1881, and No. 149,620, dated, June 17, 1882,) of which the following is a specification.

This invention has for its object improvements in dynamo-electric machines, applicable more especially for electric lighting.

My machine consists of an iron or steel disk or wheel, which is caused to revolve by a steam-engine or other motor. Near the edge of the disk are holes equidistant from each other and from the axis. In each hole a cylindrical bar of soft iron is fixed so that it is parallel to the axis and projects equally on each side of the disk. Bobbins carrying insulated copper wire are slipped onto the projecting portions of each bar, and are held on by iron plates fixed on the ends of the bars, and forming pole-pieces. The bobbins being connected together, the current from a separate small direct-current machine, called the "exciter," is sent through them, so that the iron bars become electro-magnets. When the wheel is in motion, the connection with the exciter is made by rubbing-contacts, in the usual manner. The bobbins are so connected that the end of a bar on one side of the disk has an opposite polarity to the other end on the other side, and that on the same side of the disk the ends of the bars have N. and S. polarities alternately. Each pair of half-bars projecting from either side thus form a horseshoe electro-magnet, of which the disk forms the "yoke." On either side of the revolving disk is a stationary iron ring fixed to the frame of the machine, and carrying the armature-bobbins in which the current is to be generated. The fixed and revolving rings are sensibly of the same diameter. The armature-bobbins consist of straight soft-iron cores, of a construction to be described below, with insulated wire wound on them. The cores are parallel to the axes of the machine, and their centers are all at the same distance from its center as the center of the iron cores of the electro-magnets in the revolving disk, so that as the core of an electro-magnet passes the core of an armature-coil the two cores are in the same straight line. One end of each armature-bobbin is therefore acted on by the moving magnet-poles, and the other is bolted to the fixed iron ring, which forms a common yoke to all the armature-bobbins. I have discovered that if there are the same number of armature-coils on each stationary ring as there are magnet-poles acting on it the coils act on each other by mutual induction in a very injurious manner during the working of the machine. If a certain number of lamps are being maintained by one coil, closing the circuit of the coil next to it on one side reduces the light of the lamps on the first by some twenty or thirty per cent. Closing the circuit of the next on the other side still further reduces it by a like amount. The reason is that as the currents in contiguous coils circulate in opposite directions they are in the same direction in those parts of the two coils which are immediately contiguous to each other. As the currents in the two coils are both increasing at the same time they retard each other by their mutual action. I avoid this defect by making the number of armature-coils in each ring twice the number of the magnet-coils. The magnets therefore act alternately on the alternate sets of coils. For instance, if thirty-two magnets are carried by the wheel, so that there are thirty-two poles on each side of it, I should place sixty-four armature-coils on each stationary ring, Then, at the instant when the thirty-two magnets are having their maximum action on the alternate coils 1 3 5 up to 63, the other alternate coils 2 4 6 up to 64 are practically idle. 1 and 5 still tend to act injuriously on 3, as before, but, being separated from it by the thickness of coils 2 and 4, their action is so small as to be unnoticeable. 1 and 3 induce electro-motive forces in the two sides of 2 respectively, but these are equal and in opposite directions, and so produce no current or change of current in 2. In coupling several coils together, either in quantity or series, those coils only which belong to the same set of alternate coils should be coupled. For instance, if it were desired to connect coil 1 with two other coils, 3 and 5 would be used, and not 2 and 4.

In working the machine separate coils or groups of coils may, if desired, be used for a number of separate circuits; but for incandescent lighting it is best to combine all the even-numbered coils into one circuit and all the odd-numbered ones into another. The coils in each circuit may be connected in series or quantity, or in any combination of the two that suits the lamps. In order to economize space and get more wire on the machine, the fixed coils are made wedge-shaped, the sides of the wedge being planes radial to the axis of the fixed ring that carries them.

The improvement of employing twice as many coils in each armature-ring as there are magnets in the magnet-wheel is applicable not only to dynamo-machines constructed as hereinbefore described, but also to all dynamo-machines in which the cores of the electro-magnets and of the armature-coils are straight and parallel with the axis of the machine, whether the circle of the magnets be carried by the revolving axis while the circle of armature-coils are fixed, or whether the circle of armature-coils is carried by the revolving axis while the circle of magnets is fixed, as in the well-known Siemens dynamo-machine, commonly used for producing alternate currents, and whether the armature-coils have iron cores or not. The various parts of the machine I construct in the manner hereinafter more fully described.

Figure 3:
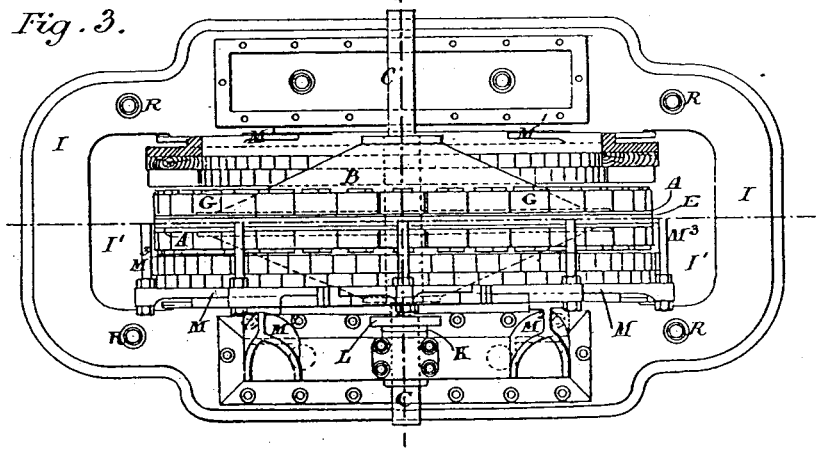
Figure 4:
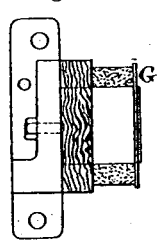
Figure 5:
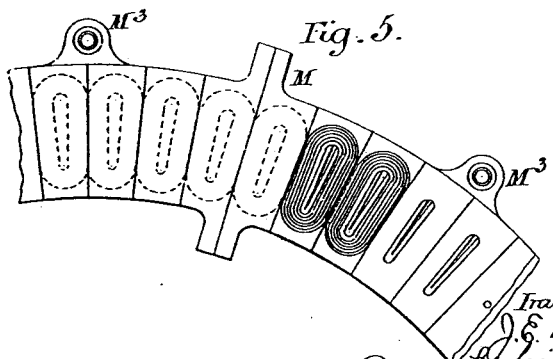
Figure 6:
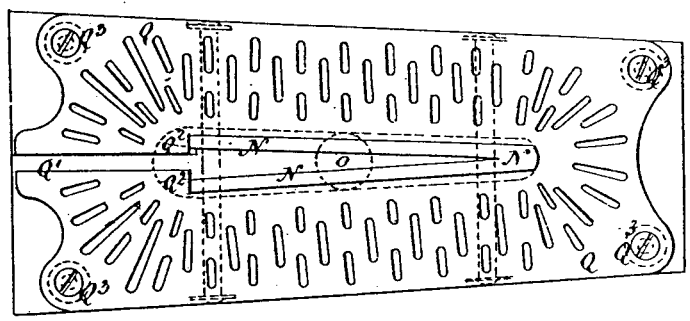
Figure 7:
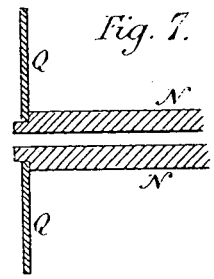
Figure 8:
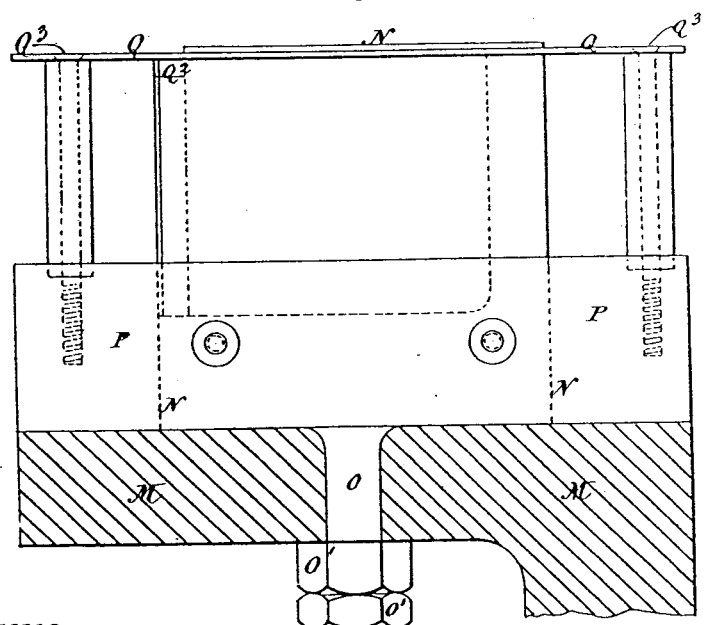
Figures 9, 10:
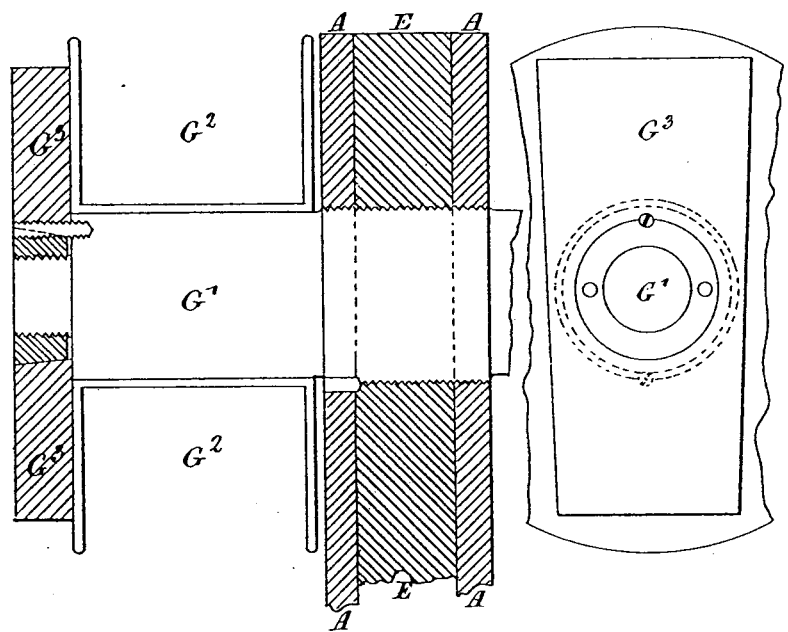
Figure 11:
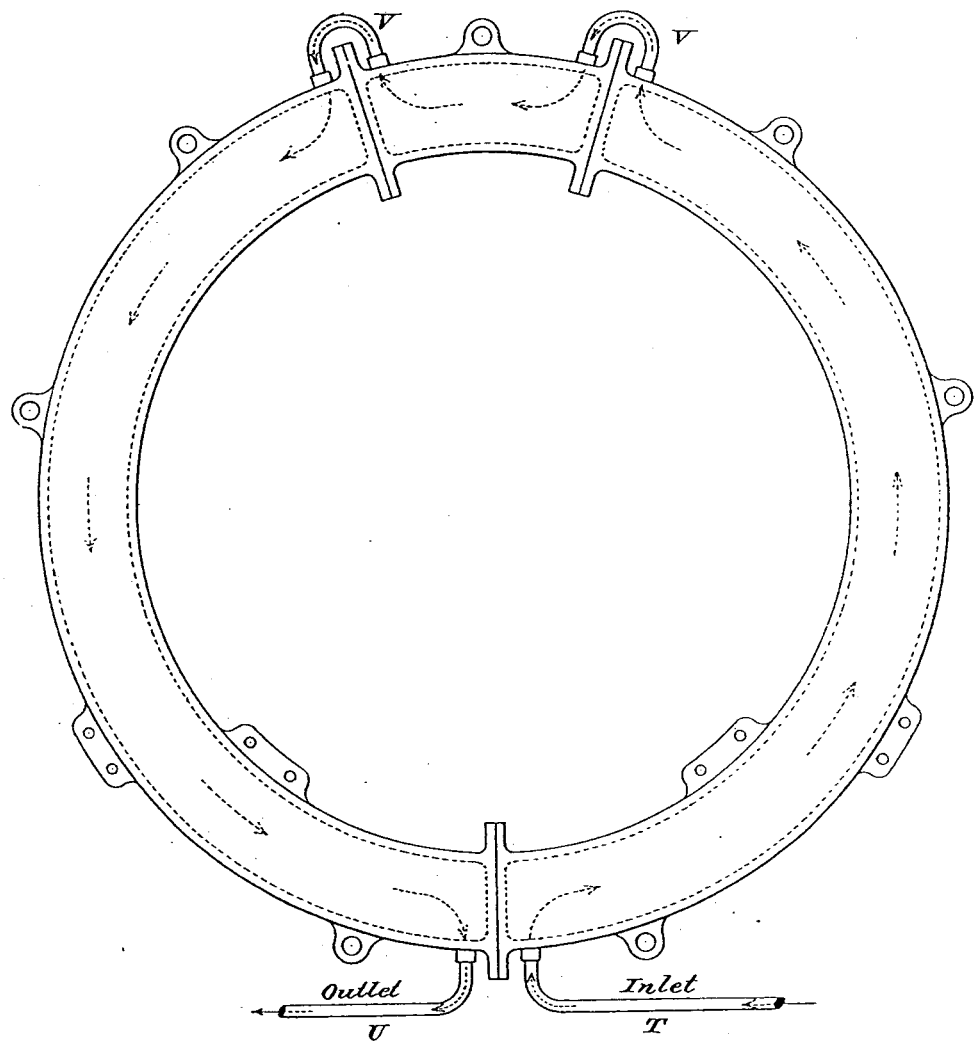
Figure 12:
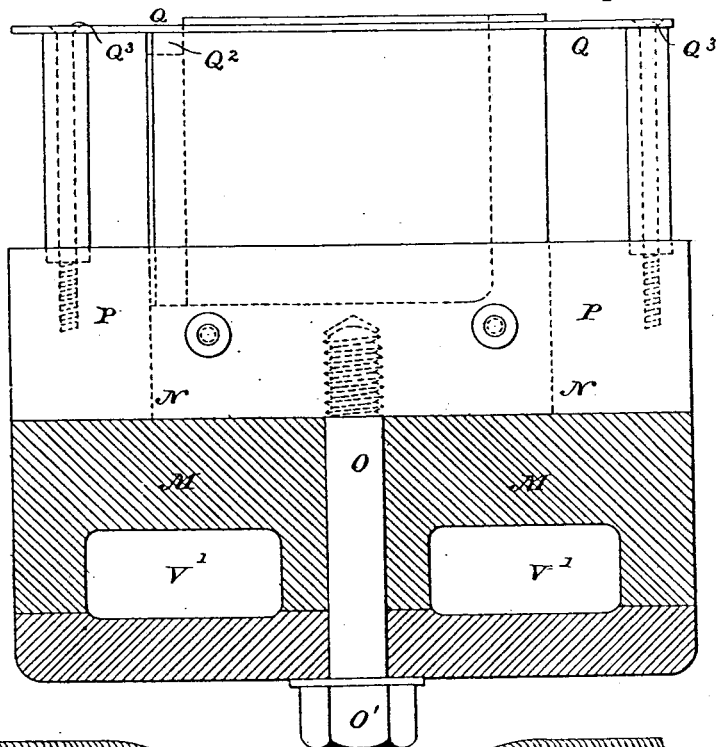
Figure 14:
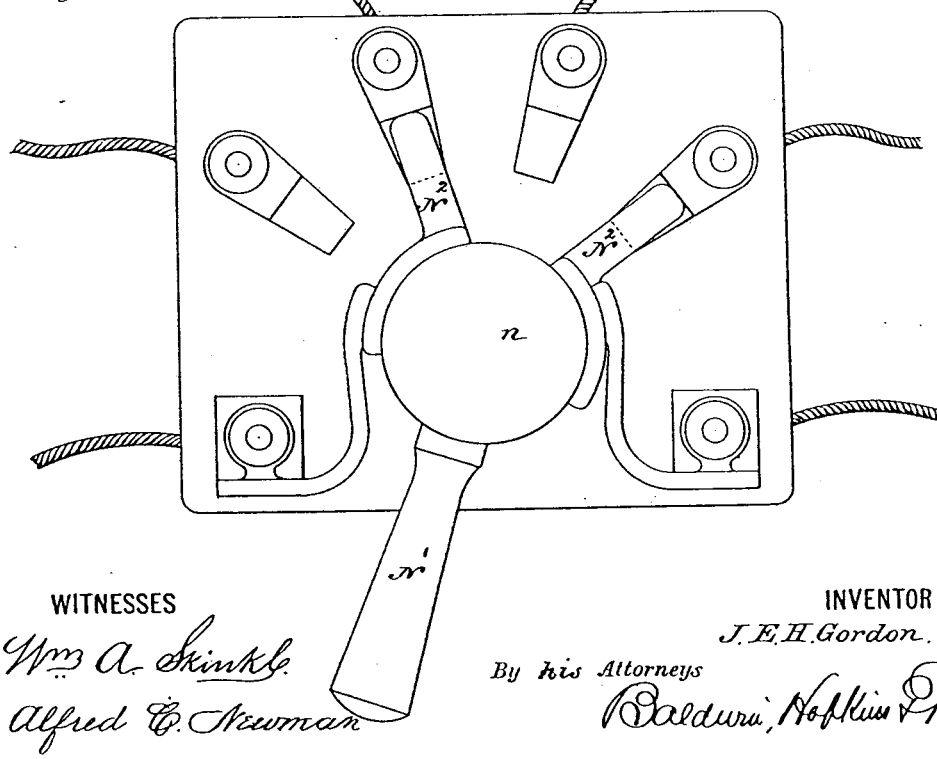
Figure 13:
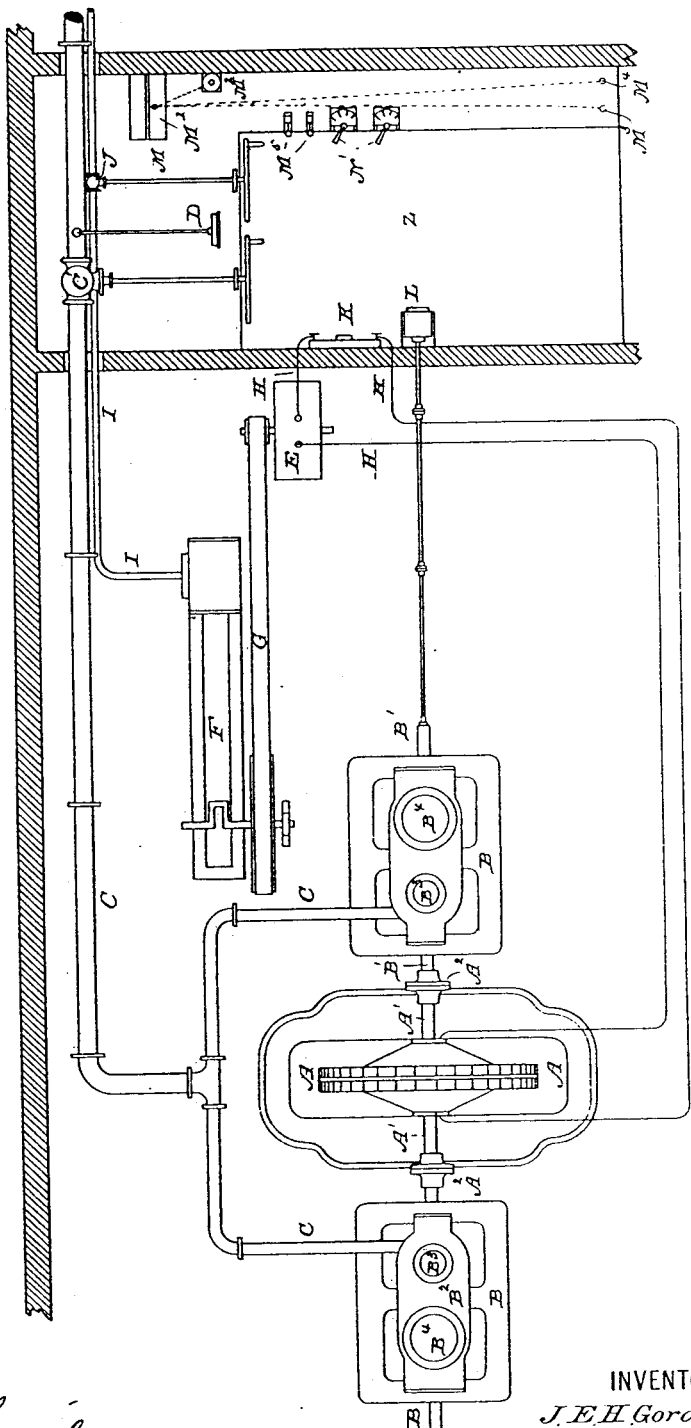

Figure 1 shows a side elevation, Fig. 2 an end elevation, and Fig. 3 a plan, of a machine constructed according to my invention. One-half of each of the above figures is shown in section. Fig. 4 shows a section of one of the fixed rings and one of the armature-coils carried by it; Fig. 5, an elevation of part of one of the fixed rings. The way in which each armature-coil is built up and secured to the ring is illustrated in this figure. Figs. 6, 7, and 8 show views of one of the armature-coils, and Figs. 9 and 10 views of one of the magnets. Figs. 11 and 12 are detail views, indicating the construction where a water-circulation in the stationary plates is employed. Fig. 13 is a diagrammatic view, illustrating the general arrangement and organization of the apparatus; and Fig. 14 is a detail view of a portion of the switching devices.

The machine represented in the drawings is of very large size, and is intended to be driven direct from a steam-engine without belt or other multiplying-gear.

The machine shown in the drawings hereunto annexed is constructed to work about six thousand Swan lamps of twenty candle-power each. The revolving wheel is eight feet diameter at the magnet-centers. The sole-plate is thirteen feet four inches long by seven feet wide. These dimensions, however, are only the dimensions of a particular machine, and are not the only useful dimensions, as the machine may be made either smaller or larger, as desired. The wheel is built up of wrought-iron boiler-plates, though steel plates might be used. The wheel consists of two central disks, A, and of two cones, B, whose bases fit upon the central disks, and through whose apices the main shaft C passes. The disks A and cones B are made of segmental pieces of boiler-plate so cut that the grain of the plate is radial to the wheel at the center of each segment. The segments are riveted together with butt-strips in the way usual in boiler-making. The disks A are kept apart at the center by a cast-iron distance-piece, D. At the rim they are kept apart by a wrought-iron ring, E. The cones B are of less diameter than the disks, so as to leave a space of flat disk all round exterior to the cones. The cones and disk are separated at the center by massive cast-iron bosses F, turned square to the shaft where they butt against the disk, and conical where they butt against the cones. The cast-iron distance-piece D is of somewhat larger diameter than the bosses, so that the disks can be riveted to it without the heads of the rivets interfering with the bosses. The cones, disks, ring, distance-piece and bosses are all firmly riveted and bolted together, being still further strengthened by angle-pieces (not shown in the drawings) placed between the disk and the cones. The disks are riveted with double butt-strips, the cones with single ones. The butt-strips of the cones are placed inside them, and the rivet-heads countersunk, so that the outsides of the cones have perfectly smooth surfaces. The flat outer portion of the wheel receives the magnets G, which in the machine from which these drawings are taken are thirty-two in number. Each magnet consists of a cylindrical iron core, G', of two bobbins, G², of brass or metal other than iron, containing wire, and of two pole-pieces, G³. The core G' passes right through a hole in the disks A and wrought-iron ring E, and is fixed so as to project equally on both sides. The brass bobbins are then slipped on, one at each side of the disk, and the pole-plates, being fixed on, hold the bobbins in their places. The pole-plates are of iron, preferably wrought. Their sides are not parallel, but form radii of the magnet-wheel. One method of securing the cores and pole-plates is shown in the drawings; but other methods may be used. The shaft C runs in bearings, preferably of phosphor-bronze, which are carried by the side frames, H. There is a large gap or opening, I', in the sole-plate I, through which a portion of the wheel dips into a pit below the machine. This enables the center of gravity to be kept low and greatly increases the stability of the machine. The end thrust is taken by two loose iron collars, K, placed on the shaft and pressed gently against the inside ends of the phosphor-bronze journals by means of set-screws projecting from the ends of the cast-iron bosses. These set-screws are secured by lock-nuts. The collars K also carry the contact-rings L for conveying the exciting-current to the magnets. The rings are preferably of phosphor-bronze, and are separated from the iron collars by split rings of vulcanite or other insulator. Brushes (not shown in the drawings) press on them in the ordinary way to convey the exciting-current to them. M are fixed rings, of cast-iron, carrying the fixed coils. They are supported by being bolted to the inside of the gap in the sole-plate at M' M', and by the four cast-iron struts M². They are also tied together by the seven screwed rods M³. Each fixed ring is made in three segments, one being much smaller than either of the other two. This is for the reason that if one of the magnet-coils breaks down it can readily be got at by removing the small segment of one of the fixed rings and turning the wheel until the damaged coil comes opposite to the gap so produced in the ring. The damaged coil can thus quickly be removed and replaced by another one. Sixty-four fixed coils are fixed to each ring, so that the sixty-four poles facing the magnet-wheel are acted on by the thirty-two magnet-poles facing them, the number of coils thus being twice the number of magnets, as hereinbefore stated. The magnet-poles on either side of the wheel are also, as before stated, alternately north and south. The details of the fixed coils are shown on a larger scale in Figs. 6, 7, and 8.

The wedge-shaped core N consists of a sheet of boiler-plate bent upon itself, so that the angle forms the thin end of the wedge, and the free edges, which do not quite meet, form the thick end. The wedge-shaped head of a T-piece, O, is inserted into one end of the folded plate and welded to it, and the stem of the T, being turned and screwed, is passed through a hole in the fixed ring and is secured by lock-nuts O'. Another method of construction is to weld in merely a wedge-shaped block, and to tap a screw-hole in it, and to secure it by a stud-bolt screwed in from the back of the fixed ring, as illustrated in Fig. 12. This enables a damaged coil to be removed without removing the heavy fixed ring. A closed channel may be made at the back of each fixed ring, through which a stream of water can be made to flow, and so return all waste heat to the feed-water of the boiler, as shown in Figs. 11 and 12. The channels V' in the segments of the ring are connected by coupling-pipes V.

T is the inlet, and U the outlet, pipe.

Where the magnet-cores are bolted to the ring M a hub projects from the bottom of the channel V', its face being flush with the sides of the channel. The bolt O, which secures the core, passes through the hub and clamps the cap or water-channel cover V² in place, as clearly illustrated.

In order that power may not be wasted in inducing currents in the plate M, a wide space is left between the wire of the coils and the plate. This space may be filled up with wooden plates or blocks P, which form the outer flange of the coil. These wooden blocks may be from one inch to three or more inches in thickness. They are three inches thick in the machine from which the drawings are taken. This improvement may be applied to any machine where the inducing-magnets act on one end of the iron cores of the armatures, while the other ends are secured to an iron plate or plates. The wood block is also useful to carry binding-screws, to which the ends of the wire are fixed. The wooden block P, hereinbefore mentioned, is slipped on the core and secured by one or more pins.

Q is a flange, of German silver, riveted onto a shoulder cut on the end of the core. In addition to the slots which are cast in it, a cut, Q', is made, passing completely through into the opening of the core. Projecting lugs Q² are cast on the German silver, which clip into the opening in the core and prevent the slot Q' from opening. The flange may be further secured by being made to project beyond the wire in places Q³, and being secured to the wood by long screws and wooden distance-pieces. These screws must of course be inserted after the wire is wound. I find it of great advantage to make the flanges of the fixed coils which are next to the magnet-poles of German silver, as above described, as it is very rigid and opposes high resistance to the circulation of electric currents in it.

R R represent the holding-down bolts.

In the machine from which the drawings are taken the wire both on magnets and on armature-coils is .185 inch in diameter.

The magnets may be excited by a direct current produced in any ordinary way.

The following is the method which I use for regulating my machine so as to keep the electro-motive force constant when the number of lamps on it is varied: The exciter is driven by a small separate steam-engine, so that its speed can be varied independently of that of the large machine. The coils are all connected into two main circuits, one composed of all the even-numbered coils and the other of all the odd-numbered ones. I usually paint the alternate coils red and blue, respectively, and then speak of the two circuits as the "red" and "blue," respectively. The switches, wires, &c., of each circuit are colored to correspond.

A dark room is constructed near the machine, and the steam-pipes of the large and small engines pass through it. Stop-valves with large hand-wheels are placed in each pipe. Near the wheels is the screen of a photometer, in which is placed a standard candle and a sample lamp from each circuit. The lamps can be lighted alternately by switches. In a convenient position are also a strophometer for showing the speed of the large engine, an Ayrtons ammeter for showing the strength of the exciting-current, and a steam-pressure gage. The big machine being set to its proper speed, the exciter is started and its speed gradually increased till the photometer shows that the lamps are of the right candle-power.

If there were any great difference in the number of lamps on each circuit, the circuit which had the fewest lamps on it would be brightest. In practice no such great difference in the number of lamps occurs when the machine is large and care is taken to select the same class of houses for supply from each circuit. The small adjustment required is made by means of the street-lamps near the machine, which, by means of switches, can be instantly transferred, fifty or one hundred at a time, from the dimmer circuit to the brighter one.

In the diagram, Fig. 13, A is the dynamo-electric machine, with its shaft A' coupled by couplings A² to the crank-shafts B' of two vertical compound steam-engines, which may be of any ordinary construction. B B represent the bed-plates of these engines; B², steam-casings inclosing the high and low pressure cylinders; B³, top of high-pressure cylinder; B⁴, top of low-pressure cylinder; C, steam-pipe for supplying steam to the steam-engines B B; C', steam stop-valve under the control of the attendant in a dark room, Z; D, steam-pressure gage in view of attendant; E, small continuous-current dynamo-electric machine, of any ordinary construction, for producing the current which is to excite the magnets of machine A; F, small steam-engine for driving small dynamo-machine E; G, endless belt for transmitting motion from a driving-wheel on the crank-shaft of F to a small driving-pulley on shaft of E; H H, insulated wires, conveying current from E to the magnet-coils of machine A. I is a steam-pipe by which steam is supplied to the small steam-engine F. J is a steam stop-valve by which the supply of steam to this engine can be controlled. K is an ammeter, of ordinary construction, for showing the strength of the exciting-current. L is a speed-gage indicator, of any ordinary construction, to show the speed at which the shaft of dynamo-electric machine A is being revolved; M, ordinary photometer-screen; M', a rod in front of it; M², candle giving standard light; M³ M⁴, two incandescent electric lamps of ordinary construction, one on the red circuit, the other on the blue circuit; M⁵ M⁵, two contact apparatus, of ordinary construction, by which the lamps M³ M⁴ can be put in or out of circuit, as desired. The two lamps are not put into circuit at the same time; but when the one on the red circuit is thrown into operation the one on the blue is thrown out of operation, and vice versa. The light given by either one or other lamp on the two circuits can thus at any time be compared with the light given by the standard candle. N N are switches, of which there may be one, two, or any other desired number. One of these is shown on a larger scale at Fig. 14. In this figure n is a circular pin or axis which can be turned by a handle, N'. It carries two metallic pieces, N², insulated from one another. One piece, N², is always in contact with one terminal, and the other piece, N², with another terminal of a line-wire upon which are, say, fifty, or any other desired number of lamps. The radial projections of the metallic pieces N² can also, as shown, either be brought into contact with two terminals on the red circuit or two on the blue circuit, and so the fifty or other number of lamps on the line-wire can, by the movement of the handle P, be transferred at once from one circuit to another, as may be required.

The right to hereafter file other applications for any matter shown or described herein and not fully claimed is reserved.

I claim as my invention—

1. The combination of the supporting-frame of the stationary bobbins, the induction-bobbins arranged thereon concentrically around the axis of the machine and parallel therewith, the rotating disk or wheel, and the traversing electro-magnets carried thereby and arranged concentrically around the axis of the machine and parallel therewith, the arrangement being such that as the wheel revolves the electro-magnets are carried past the induction-bobbins, end to end, substantially as herein described.

2. The combination, substantially as set forth, of the stationary induction-bobbins arranged concentrically around the axis of the machine and parallel therewith, and the electro-magnets arranged in the same manner, so that the traversing magnets pass the induction-coils or magnets end to end, substantially as set forth.

3. In a dynamo-electric machine, the combination of the stationary induction-bobbins arranged around the revolving axis of the machine, with their axes parallel therewith, in two circles in different vertical planes, with the interposed traversing electro-magnets arranged in like manner around the axis of the machine in a circle of equal diameter, the number of induction-bobbins in each ring being double the number of electro-magnets in the interposed ring.

4. The combination, substantially as set forth, of the back plate or stationary ring, the magnet-cores projecting therefrom, the coils carried on the ends of the cores, and a block of insulating material interposed between the coils and stationary plate to remove the coil a suitable distance from the plate, for the purpose described.

5. The combination of an electro-magnet core, the coil thereon, and an exterior flange or end piece composed of German silver, substantially as and for the purpose set forth.

6. The combination of the split or open-ended magnet-core and the slotted flange Q, carried on its end and provided with lugs Q² Q², which enter the opening in the core, substantially as described.

7. In a dynamo-electric machine, the combination of the disks A A, the distance-piece D, the ring E, the electro-magnets carried by the disks A A, the coned plates B B, and the bosses F, interposed between the coned plates and the disks.

8. The combination, substantially as set forth, of the disks A A, the ring E, the magnet-cores G, projecting from the disks, upon each side, bobbins on each of the projecting ends of the cores G, and suitable pole-pieces.

9. The combination, in a dynamo-electric machine, of the bed-plate I, having the opening or gap I' therein, the fixed rings M, bolted to the inside of the bed-plate, the tie-rods $M^3$, the low standards carrying the axle of the revolving wheel, and the struts which extend from the tops of said standards and brace the fixed rings M.

10. The combination of the fixed rings M, composed of segments or sections, one of which is removable, with an interposed traversing wheel carrying the electro-magnets, substantially as set forth.

11. The combination, substantially as set forth, of the open-ended or slotted core N, formed by bending a piece of metal, or otherwise, a block welded or secured within the opening thereof, and a bolt which binds said block and core to the support or ring M.

12. The combination, in a dynamo-electric machine, of the stationary metallic rings or disks, the armature-cores and bobbins carried thereby, channels or water-ways formed in the body of the ring, and provided with suitable inlet and outlet pipes, and a water-service for the removal and recovery of the waste heat, substantially as set forth.

13. The combination, substantially as set forth, of the fixed rings or disks M, the V-shaped magnet-cores mounted thereon and arranged concentrically and radially around the axis of the machine, with their axes parallel thereto, and the traversing electro-magnets arranged in like manner in a like concentric circle, and carried on a disk or wheel mounted on the main shaft.

JAMES EDWARD HENRY GORDON.

Witnesses:
F. SPANSWICK,
24 *Southampton Buildings, London, Clerk.*
JOHN DEAN,
17 *Gracechurch Street, London, Notary's Clerk.*